Sept. 2, 1958 B. A. SMITH 2,850,250
TURBINE POWERED CONVERTIBLE AIRCRAFT
Filed April 18, 1955 3 Sheets-Sheet 1

INVENTOR.
BEDFORD A. SMITH
BY
*John H. Widdowson*
ATTORNEY

Sept. 2, 1958            B. A. SMITH            2,850,250

TURBINE POWERED CONVERTIBLE AIRCRAFT

Filed April 18, 1955            3 Sheets-Sheet 2

INVENTOR.
BEDFORD A. SMITH

BY

John H. Widdowson

ATTORNEY

INVENTOR.
BEDFORD A. SMITH

BY
*John H. Widdowson*
ATTORNEY

United States Patent Office 2,850,250
Patented Sept. 2, 1958

2,850,250

TURBINE POWERED CONVERTIBLE AIRCRAFT

Bedford A. Smith, Wichita, Kans.

Application April 18, 1955, Serial No. 501,924

13 Claims. (Cl. 244—7)

This invention relates to new engine means. In a more specific aspect, this invention relates to new internal combustion turbine means utilizing centrifugal compressor means. In a still more specific aspect, this invention relates to new turbo-jet engine means. Still a more specific aspect of this invention relates to new internal combustion turbine engine means powering a drive shaft. In yet a more specific aspect, this invention relates to new jet engine means having a propeller and shaft therefor powered by said engine. In still more specific aspects, this invention relates to new aircrafts utilizing my new engine means, particularly turbo-jet powered aircraft and aircraft powered both by jet thrust and propeller means.

Jet engines are known in the art, both turbo-jet engines and turbo-propeller engines, and internal combustion turbines have long been known. However, my new internal combustion turbine means utilizing centrifugal force to compress combustion air is far superior to those known in the art, and my new engine means is particularly easily and readily adapted for use in aircraft. My new gas turbine engine can be used as the source of power in conventional type turbo-jet engine or a turbo-propeller engine, or, because of its unique structure, it can be used as an aircraft itself along with the necessary guiding and supporting mechanisms common to all types of aircraft, that is, convenient housing for my new engine means readily provides substantially all the lifting airfoil which is needed in the aircraft embodiments of my invention. These advantages of my new engine means are not present in any of the internal combustion turbine engine means of the prior art, and such along with the efficiency and economy of my new engine means makes my contribution to the art very substantial, I believe.

I have invented new engine means having centrifugal compressor means. These compressor means have stator blades spaced around a central portion of the engine. A rotor member having rotor blades is mounted to rotate around this central portion. In operation the rotor blades and stator blades coact to compress an oxygen-containing gas passed into the engine, such compressed gas being subsequently used to sustain combustion of the engine fuel. The engine has a combustion chamber positioned and mounted to receive compressed oxygen-containing gas from the compressor. Means to introduce fuel into the combustion chamber is provided and the fuel is burned therein. The rotor of the engine has turbine blades connected thereto which are positioned and adapted to receive the products of combustion from the combustion chamber to turn said rotor. In a specific desired embodiment of my invention, the new engine means has circular counterrotating rotors in stacked relation within a discus-like housing or shell, and if desired, one or more drive shafts can be radially mounted between said rotors and gearedly connected to same so that the drive shafts are turned upon rotation of the rotors in operation. The drive shaft can, if desired, be used to power a propeller mounted thereon, and the shell when streamlined can readily form the lifting airfoil of an aircraft. My new engine means with counterrotating rotors develops no torque, and I have found it desirable in aircraft operation with powered propellers that counterrotating propeller shafts be used to likewise eliminate undesirable torque. In aircraft operation, the combustion gases leaving the turbine blades are advisedly directed rearwardly in a jet to thrust the engine forward and in turn the aircraft in which it is mounted, if such is the case.

It is an object of this invention to provide new engine means.

It is another object of this invention to provide new internal combustion turbine means utilizing centrifugal compressor means.

It is still another object of this invention to provide new turbo-jet engine means.

Yet another object of this invention is to provide new internal combustion turbine engine means powering a drive shaft and providing a jet for thrust, if desired.

Another object of this invention is to provide new jet engine means having a propeller and shaft therefor powered by said engine.

Still other objects of this invention are to provide new aircrafts utilizing my new engine means, particularly turbo-jet powered aircraft and aircraft powered not only by the thrust of a jet and the compressor of my new engine but also by propeller means powered from a shaft in turn powered by such engine.

Other objects and advantages of the new engine means of my invention will become apparent to those skilled in the art upon reading this disclosure.

Drawings accompany and are a part of this disclosure. These drawings depict preferred specific embodiments of the new engine means and aircrafts of my invention, and it is to be understood that such are not to unduly limit the scope of my invention.

Figure 1:
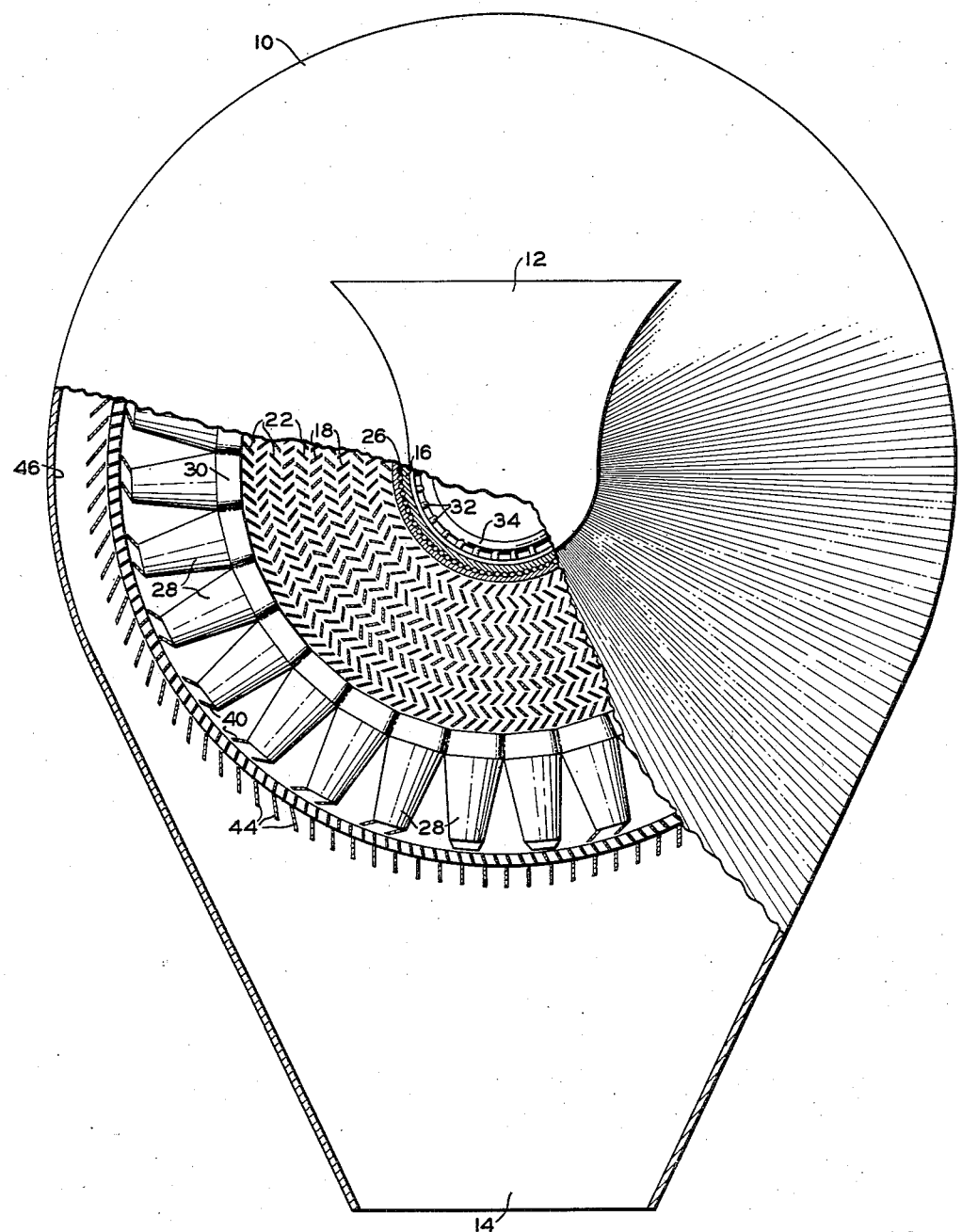
Fig. 1 is a plan view partly in cross section and partly cut away of a preferred specific embodiment of the new engine means of my invention.

Following is a discussion and description of my invention. Such is made with reference to the drawings whereon the same reference numerals are used to indicate the same parts or structure. The description and discussion is of preferred specific embodiments of my invention, and it is to be understood that such is not to unduly limit the scope of my invention.

Figure 2:
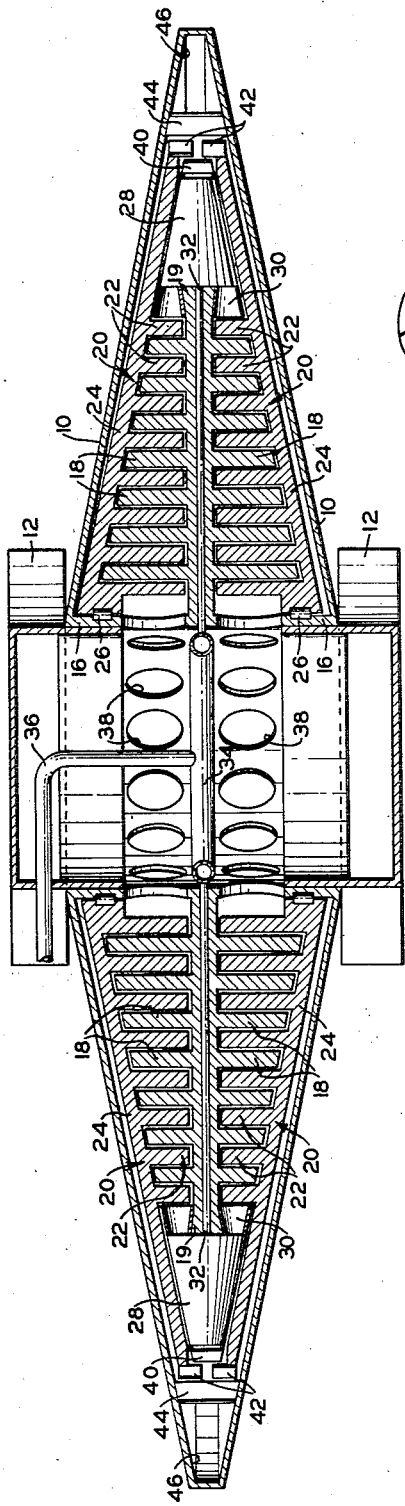
Fig. 2 is an enlarged cross sectional elevation view of the engine means shown in Fig. 1.
Figure 3:
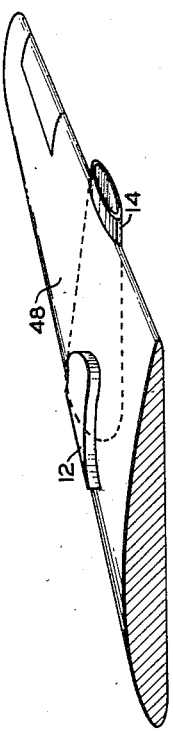
Fig. 3 is a perspective view of an aircraft wing showing a preferred mounting of the engine of Figs. 1 and 2.

The working parts of the turbo-jet engine of Figs. 1, 2 and 3 are housed in streamline discus-like shell 10 on which is mounted air scoop means 12 through which atmospheric air passes into the engine to be compressed by the compressor thereof. The shell or housing 10 of the engine is closed in its forward portion and has an open rear portion 14 through which combustion gases exit to form the jet which thrusts the engine forward and in turn the aircraft in which the engine is mounted. Centrally mounted in any suitable manner in shell 10 is a hollow hub portion 16 around which the moving parts of the engine are rotatably mounted.

The centrifugal compressor of the engine preferably has a plurality of rows of spaced stator blades 18 radially disposed and mounted around the hub portion 16. Blades 18 project outwardly from a central member or portion 19 which is suitably mounted on hub 16. As many rows of stator blades as desired can be used, depending on the number of stages of compression desired. The upper stator blades 18 coact with the upper rotor of the engine and the lower stator blades 18 coact with the lower counterrotating rotor of the engine. Upper and lower rotors 20 have rotor blades 22 projecting inwardly from an outer plate or disk portion 24. The preferably circular rotors 20 are rotatably mounted around the hub portion 16 in any suitable manner. I have found that mounting with roller bearings 26 as shown is very convenient. The rotors 20 which counterrotate and which are in stacked relation and balanced develop no torque in operation.

A plurality of combustion chambers 28 are mounted and spaced around the outer limits of the unique compressor means in any suitable manner, such receiving air compressed by the centrifugal compressor. Ducts or conduits 30 are suitably mounted between the compressor and the combustion chambers 28. Compressed air is passed through these ducts 30 into the combustion chambers 28 to sustain fuel combustion therein.

The stationary portion 19 of the stator of the compressor can conveniently house the fuel conduits 32 for passing fuel to combustion chambers 28. A header 34 for the fuel conduits 32 is preferably used and fuel is supplied to the header 34 by conduit 36 from suitable fuel tank supply means. Combustion air is supplied to the engine compressor means from air scoops 12 and hollow hub 16 by conduits or openings 38. Stationary guide vanes 40 are suitably mounted in shell 10 at the outlet of combustion chambers 28 to direct exiting combustion gases against the turbine means of the engine in the desired direction.

The turbine structure of special advantage and preferred is that shown, that is, an integral extension of portion 24 of the rotors on which is mounted turbine blades 42, the upper and lower rotors being powered by the same exhaust jet from the combustion chambers. This is a particularly advantageous structure, since the rotors 20 can easily be powered for counterrotation by merely making the pitch of turbine blades 42 on the two rotors opposite to each other. One turbine stage is shown in the drawings. Additional stages can be employed by adding additional turbine blades in radially disposed rows.

Combustion gases from in contact with turbine blades 42 strike stationary guide vanes 44 which are positioned to rearwardly direct the gases. An annular collecting chamber 46 communicating with exhaust 14 provides for passing the combustion gases out of the engine to the rear to thrust the engine forward.

While the engine can be used as a stationary gas turbine to power a centrally mounted or radially mounted drive shaft, I have found a very advantageous use for the engine, namely, as a turbojet engine to power aircraft, and the mounting for such is diagrammatically shown in Fig. 3 where the engine is mounted in an aircraft wing 48. This ideal use for the engine is readily seen.

Figure 4:
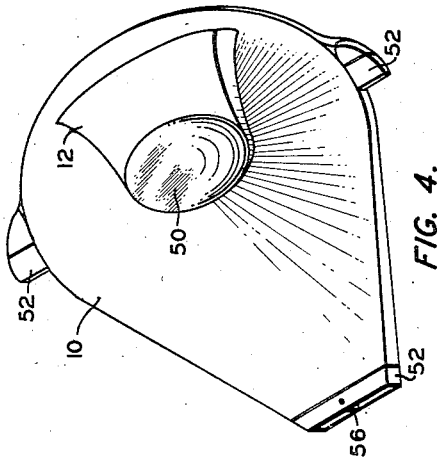
Fig. 4 is a perspective view of a preferred specific embodiment of an aircraft embodying my new engine means in a housing which also serves as the principal lifting airfoil of the aircraft.
Figure 5:
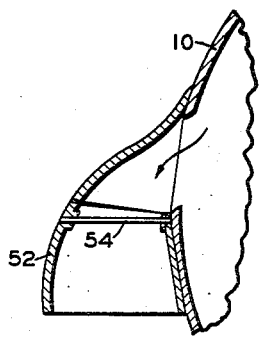
Fig. 5 is a cross sectional plan view of the side portion directional exhaust means used to power and control the aircraft of Fig. 4.
Figure 6:
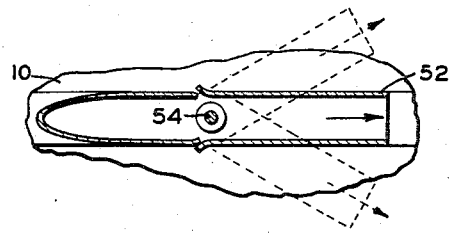
Fig. 6 is a cross sectional elevation view of the side portion directional exhaust means of Figs. 4 and 5.

Figs. 4, 5 and 6 depict and show a new design of aircraft which utilizes my new engine means, showing the tremendous advantage of my new engine in that the shell or housing 10 for the engine proper can readily be made streamline as shown in Figs. 1 and 2 to provide substantially all the lifting airfoil of the aircraft. Air scoop 12 is mounted with intake forward to deliver air to the compressor, and a dome 50 for pilot, passengers, controls, etc., can be conveniently mounted centrally over compartments can be conveniently mounted centrally over the hollow hub portion of the craft. The aircraft is controlled by side and rear portion exhausts which are movable so that the direction of exhaust discharge can be changed to guide the aircraft. The exhaust nozzles 52 are movable up and down around pivot pin 54, the side nozzles 52 performing the usual function of ailerons and the rear nozzle performing the usual function of elevators. A pivoted baffle 56 in rear nozzle 52 directions rear exhaust laterally which serves the usual function of an aircraft rudder. Upper and lower air scoops 12 can be used, if desired, and a single upper scoop 12 has been found to be satisfactory. Any suitable landing gear means can be mounted on the new type of aircraft of my invention of Figs. 4, 5 and 6, retractable or otherwise. The desirable engine means for these aircraft is that of Figs. 1 and 2, and the operation is one of passing air in through air scoop 12 and openings 38 into the compressor. The rotors 20 are counterrotated and blades 22 of same coact with stator blades 18 to compress the air along with centrifugal force. Such compressed air and fuel through conduits 32 is passed to combustion chambers 28 wherein the fuel is burned. The combustion gases exit from chambers 28 and are directed by vanes 40 onto turbine blades 42, resulting in turning the turbine means and in turn rotors 20. The combustion gases leaving the turbine are discharged out of the exhausts to thrust the engine and aircraft forward and to guide the aircraft.

Figure 7:
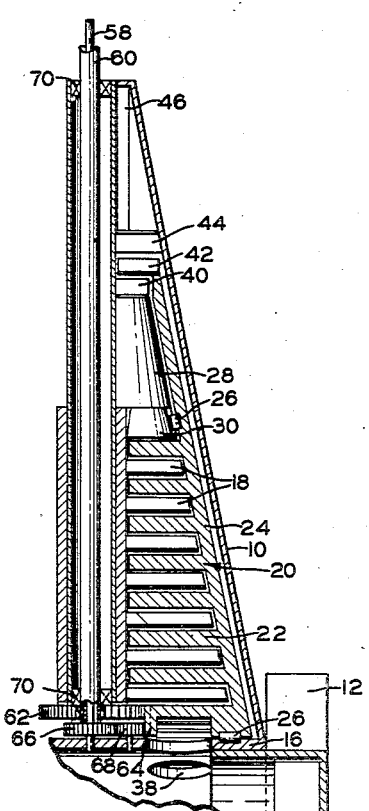
Fig. 7 is a cross sectional elevation view of a preferred specific embodiment of the new engine means of my invention having counterrotating drive shafts powered thereby.
Figure 8:
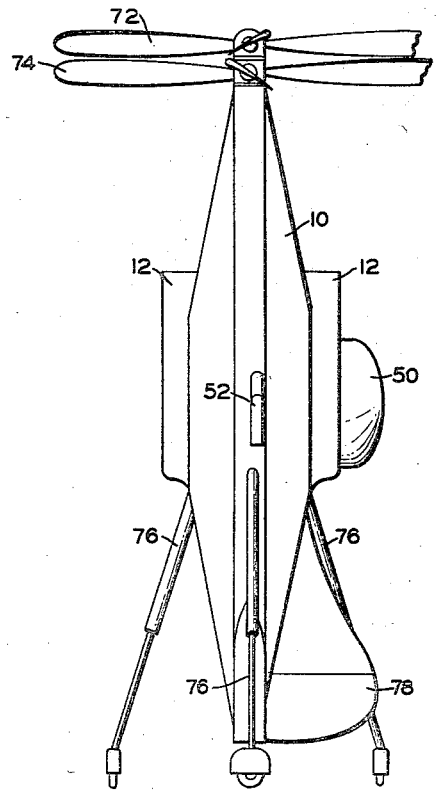
Fig. 8 is a side elevation view of a preferred specific aircraft embodying the new engine means of my invention depicted in Fig. 7, and wherein the shell or housing for the engine forms substantially all the lifting airfoil for the aircraft.

Fig. 7 shows the new engine means of my invention embodied in an internal combustion turbine which is geared to power a drive shaft, specifically counterrotating drive shafts mounted one inside the other, and in Fig. 8 is shown new aircraft means of my invention utilizing the engine means of Fig. 7 wherein the engine is a turbo-propeller engine having propellers mounted on the outer ends of the counterrotating drive shafts. Fig. 7 shows one quadrant of the engine in cross sectional elevation, and it, like the engine of Figs. 1 and 2, has counterrotating rotors 20 with rotor blades 22 which coact with stator blades 18. Combustion gases from chambers 28 power the rotors by reacting with turbine blades 42 on an integral extension of rotor 20, and the gases from in contact with the turbine blades are collected in annular chamber 46 and discharged out the rear of the engine and aircraft to thrust the aircraft forward. In the central portion of the engine between the counterrotating rotors 20, the counterrotating drive shafts 58 and 60 are radially mounted, shaft 58 coaxially mounted within hollow shaft 60. The outer shaft 60 has a spur gear 62 thereon and both rotors 20 are toothed as at 64 to turn spur gear 62 upon rotation of rotors 20. The inner shaft 58 has a spur gear 66 thereon which acts with another spur gear 68 mounted on hub 16 and teeth 64 to rotate shaft 58 in a direction opposite to shaft 60 upon rotation of rotors 20. Bearings 70 mount the shafts for rotation between the rotors 20. The engine means operates in the same manner as does the engine of Figs. 1 and 2.

The aircraft of Fig. 8 has counterrotating propellers 72 and 74 mounted on drive shafts 58 and 60, respectively. And airfoil and shell or housing 10 has tripod landing gear means 76 mounted thereon to support the aircraft. A rudder 78 is shown on this embodiment of aircraft of my invention. However, guiding of the aircraft by engine exhaust streams can be used, if desired.

As will be evident to those skilled in the art, various modifications of my invention can be made, or followed, in the light of this disclosure and discussion, without departing from the spirit or scope of the disclosure or from the scope of the claims.

I claim:
1. A turbo-jet engine comprising, in combination, a stream-line discus-like housing closed in its forward portion and having an exhaust in its rearward portion, a hollow hub portion centrally mounted in said housing with an upper and lower atmospheric air inlet, air scoop means mounted on said housing to direct air into said inlets, multiple stage centrifugal compressor means comprising a plurality of spaced rows of stator blades extending radially from and around said hub portion within said housing and circular counterrotating rotors having radially spaced rows of rotor blades and co-axially mounted in mirror image relation to counterrotate around said hub with said stator and rotor blades coacting to compress air, conduits communicating with said air inlets and said compressor means and said compressor means adapted to receive and compress air upon rotation, a plurality of spaced combustion chambers mounted within said housing around said compressor means adapted to receive compressed air from said compressor, a plurality of stationary vanes mounted in said housing between said compressor means and combustion chambers adapted to direct air from said compressor means into said combustion chambers, means to introduce fuel into said combustion chambers, integral extensions of said rotors within said housing having turbine blades in the end portions thereof adapted to receive combustion gases from said combustion chambers to turn said rotors, a plurality of stationary vanes mounted in said housing between said combustion chamber and said turbine blades adapted to direct said combustion gases into contact with said turbine blades, an annular space within said housing communicating with said exhaust adapted to receive said combustion gases from said turbine blades and pass same out through said exhaust to thrust said engine forward, and a plurality of stationary vanes mounted within said housing adapted to direct said combustion gases from said turbine blades rearwardly into said annular space.

2. A jet engine comprising, in combination, a discus-like housing, exhaust means in the rear portion of said housing, a hub portion mounted within said housing, centrifugal compressor means comprising a plurality of spaced rows of stator blades extending radially from and around said hub portion within said housing and circular counterrotating rotors having spaced rows of rotor blades mounted to counterrotate around said hub with said stator and rotor blades coacting to compress air, means to pass air to said compressor means, a plurality of spaced combustion chambers mounted within said housing around said compressor means adapted to receive compressed air from said compressor, means to introduce fuel into said combustion chambers, integral extensions of said rotors within said housing having turbine blades therewith adapted to receive combustion gases from said combustion chambers to turn said rotors, and a collecting chamber within said housing adapted to receive said combustion gases from said turbine blades and pass same out through said exhaust to thrust said engine forward.

3. A jet engine comprising, in combination, centrifugal compressor means comprising a plurality of radially spaced rows of stator blades around a central hub portion and counterrotating rotors having spaced rows of rotor blades mounted to counterrotate around said central portion co-axially with the axis of said rows of stator blades and with said stator and rotor blades coacting to compress an oxygen-containing gas, a plurality of spaced combustion chambers around said compressor means adapted to receive compressed oxygen-containing gas, said rows of stator blades being between said hub portion and said combustion chambers, means to introduce fuel into said combustion chambers, and turbine means having turbine blades connected to said rotors to turn therewith and adapted to receive combustion gases from said combustion chambers to turn said rotors.

4. An engine comprising, in combination, centrifugal compressor means comprising, a row of stator blades projecting from a fixed member and radially spaced from and around a central hub portion, said fixed member extending out from said hub portion and said stator blades having axes transverse the plane of said fixed member, and a rotor having rotor blades mounted to rotate around said central hub portion with said rotor co-axial with the axis of said row of stator blades, and said stator and rotor blades coactable to compress an oxygen-containing gas, said rotor extending out from said hub portion and said rotor blades projecting from said rotor and having axes transverse the plane of said rotor, a combustion chamber mounted at the outlet of said compressor means and adapted to receive compressed oxygen-containing gas, means to introduce fuel into said combustion chamber, and turbine means having turbine blades connected to said rotor to turn therewith and adapted to receive combustion gases from said combustion chamber to turn said rotor.

5. An aircraft, comprising, in combination, a stream-line discus-like shell closed in its forward portion forming the lifting airfoil of said aircraft, exhaust means in the rear portion of said shell movably mounted to direct exhaust from said engine laterally and longitudinally to serve as rudder and elevators, movable exhaust nozzles mounted on the side portions of said shell to direct exhaust from said engine longitudinally to serve as ailerons, a hollow hub portion centrally mounted within said shell with an upper and lower atmospheric air inlet, air scoop means mounted on said shell to direct air into said inlets, a jet engine mounted in said shell comprising centrifugal compressor means having a plurality of spaced rows of stator blades extending radially from and around said hub portion within said shell, and circular counterrotating rotors having spaced rows of rotor blades mounted to counterrotate around said hub with said stator and rotor blades coacting to compress air, conduits for air communicating with said air inlets and said compressor means, a plurality of spaced combustion chambers mounted within said shell around said compressor means adapted to receive compressed air from said compressor, means to introduce fuel into said combustion chambers, integral extensions of said rotors within said shell having turbine blades therewith adapted to receive combustion gases from said combustion chambers to turn said rotors, and a collecting chamber within said shell adapted to receive said combustion gases from said turbine blades and pass same out through said rear and side exhausts to thrust said aircraft forward and to guide same.

6. An aircraft, comprising, in combination, a stream-line shell forming a lifting airfoil of said aircraft, exhaust means n the rear and side portions of said shell to propel and guide said aircraft, a central hub portion mounted within said shell, a jet engine comprising a centrifugal compressor having stator blades spaced around said hub portion and counterrotating rotors having rotor blades mounted to rotate around said hub portion with said stator and rotor blades coactable to compress an oxygen-containing gas, a combustion chamber adapted to receive compressed oxygen-containing gas, and turbine means having turbine blades connected to said rotors to turn therewith and adapted to receive combustion gases from said combustion chamber to turn said rotors, means to deliver oxygen-containing gas to said compressor, means to introduce fuel into said combustion chamber, and collecting means within said shell to receive combustion gases from said turbine blades and pass same out through said exhaust means to thrust said aircraft forward and to guide same.

7. The jet engine of claim 2 wherein a first propeller shaft is radially mounted forward between said counterrotating rotors and gear means connecting said propeller shaft and both of said rotors adapted to turn said propeller shaft upon counterrotation of said rotors, and a second propeller shaft mounted within said first propeller shaft and gear means connecting said second propeller shaft and both of said rotors adapted to turn said second propeller shaft opposite to said first propeller shaft upon counterrotation of said rotors.

8. The jet engine of claim 3 wherein counterrotating propeller shafts are radially mounted between said counterrotating rotors, and gear means connecting said counterrotating propellers and rotors adapted to turn said propellers upon rotation of said rotors.

9. The engine of claim 4 wherein a drive shaft is mounted to be turned upon rotation of said rotor, and gear means connecting said drive shaft and rotor to turn said drive shaft upon rotation of said rotor.

10. The aircraft of claim 5 wherein a first propeller shaft having a propeller to turn therewith is radially mounted forward between said counterrotating rotors and gear means connecting said propeller shaft and both of said rotors adapted to turn said propeller shaft upon counterrotation of said rotors, a second propeller shaft having a propeller to turn therewith mounted within said first propeller shaft and gear means connecting said second propeller shaft and both of said rotors adapted to turn said second propeller shaft opposite to said first propeller shaft upon counterrotation of said rotors, and landing gear mounted on the rear portion of said shell adapted to support said shell vertically.

11. The aircraft of claim 6 wherein a propeller shaft having a propeller to turn therewith is radially mounted forward between said counterrotating rotors, and gear means connecting said propeller shaft and rotors to turn said propeller shaft upon rotation of said rotors.

12. Engine means, comprising, in combination, centrifugal compressor structure having a fixed hub and an outer fixed member attached to and around said hub and extending radially therefrom, stator blades attached to said fixed member and extending substantially parallel to the axis of said hub, a rotor member mounted for rotation on said hub, said rotor having rotor blades attached thereto and extending toward said fixed member and substantially parallel to said axis of said hub, said stator and rotor blades coactable to compress an oxygen-containing gas, reaction means positioned and adapted to receive resulting compressed oxygen-containing gas whereby same can be reacted to increase volume, and turbine means having blades operatively connected to said rotor to turn same and adapted to receive reaction gases from said reaction means to turn said rotor.

13. Engine means, comprising, in combination, centrifugal compressor structure having a fixed hub and an outer fixed member attached thereto around said hub and extending radially therefrom, stator blades attached to said fixed member and projecting in both directions therefrom and substantially parallel to the axis of said hub, counterrotating rotor members mounted for rotation on said hub one on each side of said fixed member, each of said counterrotating rotors having rotor blades attached thereto and projecting toward said fixed member and substantially parallel to said axis of said hub, said stator and rotor blades coactable to compress an oxygen-containing gas, reaction means positioned and adapted to receive resulting compressed oxygen-containing gas whereby same can be reacted to increase volume, and turbine means having blades operatively connected to said counterrotating rotors to turn same and adapted to receive reaction gases from said reaction means to turn said rotors.

References Cited in the file of this patent

UNITED STATES PATENTS

| | | |
|---|---|---|
| 989,834 | Clarke | Apr. 18, 1911 |
| 2,460,523 | Moller | Feb. 1, 1949 |
| 2,461,435 | Neumann et al. | Feb. 8, 1949 |
| 2,619,797 | Haworth | Dec. 2, 1952 |
| 2,648,491 | Wood | Aug. 11, 1953 |
| 2,658,700 | Howell | Nov. 10, 1953 |

FOREIGN PATENTS

| | | |
|---|---|---|
| 724,176 | Great Britain | Feb. 16, 1955 |
| 1,003,735 | France | Nov. 21, 1951 |